United States Patent [19]

Stannard et al.

[11] Patent Number: 5,624,709
[45] Date of Patent: Apr. 29, 1997

[54] HIGH RESOLUTION DIFFERENTIAL SPECTROMETRY SYSTEM

[75] Inventors: John E. Stannard; Cathy M. Peterson, both of Santa Barbara; Roger A. West, Ventura; Geoffrey A. Walter, Santa Ynez, all of Calif.

[73] Assignee: Santa Barbara Research Center, Goleta, Calif.

[21] Appl. No.: 480,223

[22] Filed: Jun. 7, 1995

[51] Int. Cl.$^6$ .................................................. B05D 5/06
[52] U.S. Cl. ..................... 427/162; 356/303; 356/320; 356/332; 427/164; 427/248.1
[58] Field of Search .................. 356/303, 320, 356/332; 427/162, 164, 248.1

[56] References Cited

U.S. PATENT DOCUMENTS

| | | | |
|---|---|---|---|
| 4,262,056 | 4/1981 | Hubler et al. | 427/162 X |
| 4,317,137 | 2/1982 | Tompkins | 358/286 |
| 4,545,646 | 10/1985 | Chern et al. | 427/162 X |
| 5,181,143 | 1/1993 | Southwell | 427/162 X |
| 5,294,288 | 3/1994 | Melpolder et al. | 427/163.1 |
| 5,425,964 | 6/1995 | Southwell et al. | 427/10 |

OTHER PUBLICATIONS

H. A. Macleod, *Thin-Film Optical Filters, Second Edition*, MacMillan Publishing Co., New York (1986), pp. 234–313.

Primary Examiner—Michael Lusignan
Attorney, Agent, or Firm—W. C. Schubert; W. K. Denson-Low

[57] ABSTRACT

A differential spectrometry system detects very narrow-band spectral features, while providing much higher optical transmittance and signal-to-noise ratios than prior optical-filter-based spectrometer systems. A plurality of light detectors (10a, 10b) detect light that falls within respective wide wavebands. The wide wavebands have overlapping and non-overlapping portions, one of which is the desired narrow waveband. The detector outputs are operated upon to produce an output signal (22) which includes substantially only the desired narrow waveband. In the preferred embodiment, the light detectors (10a, 10b) are implemented with a pair of optical detectors (30a, 30b) and respective optical interference filters (24a, 24b). The filters have substantially identical cut-off wavelengths ($\lambda_2$) and cut-on wavelengths that are shifted by $\Delta\lambda$ with respect to each other ($\lambda_1$ and ($\lambda_1+\Delta\lambda$), respectively). The detector outputs are differenced with an operational amplifier (33), so that detector signals resulting from spectral features common to both detectors (30a, 30b) are canceled. The remaining signal (36) varies according to the amount of light that falls between wavelength boundaries [$\lambda_1$ and ($\lambda_1+\Delta\lambda$)]. A preferred method of fabricating the optical interference filters (24a, 24b) is also provided.

7 Claims, 3 Drawing Sheets

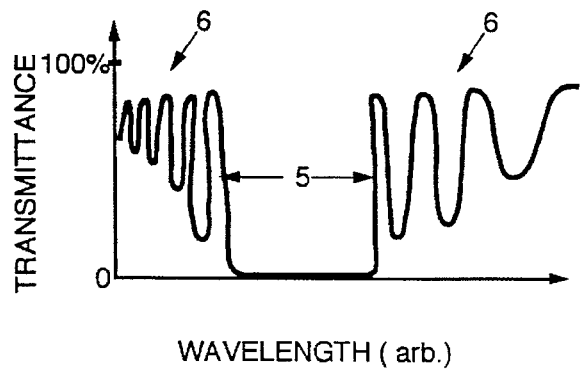
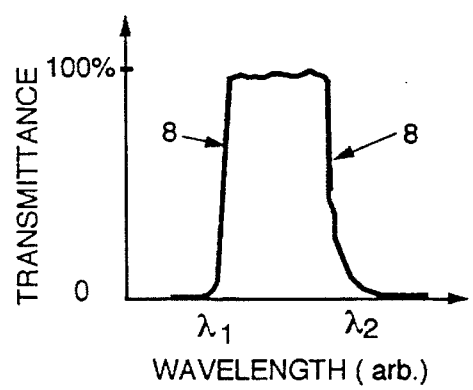
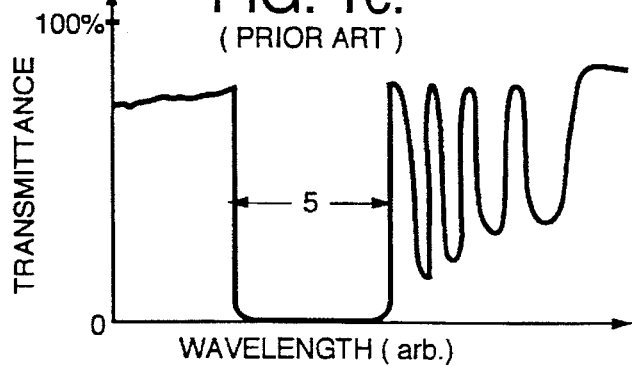
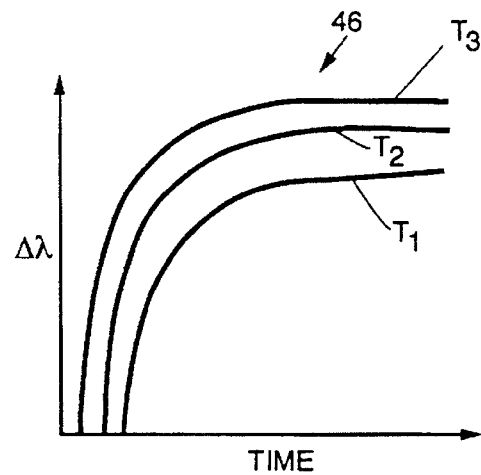
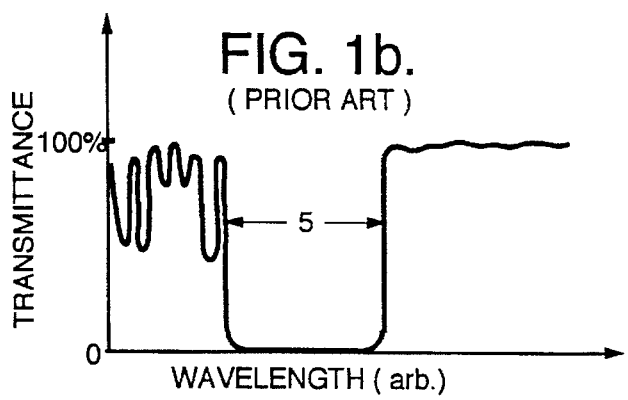

HIGH RESOLUTION DIFFERENTIAL SPECTROMETRY SYSTEM

BACKGROUND OF THE INVENTION

1. Field of the Invention

This invention relates to spectrometry, and more particularly to differential spectrometry using discrete optical filters.

2. Description of the Related Art

Optical interference filters are used for a wide variety of applications, particularly in the field of spectrometry. For example, a narrow band optical filter may be employed in a system that is designed to detect the presence of a particular chemical compound in the atmosphere. The filter is designed to transmit only the light that falls within the absorption band of the desired chemical compound, thereby masking other absorption bands found in the atmosphere.

Interference filters are described in H. A. Macleod, *Thin-Film Optical Filters, Second Edition*, Macmillan Publishing Co., New York (1986), pages 234–313. They typically comprise a quarter-wave (QW) stack that is deposited on an optically transmissive substrate by vacuum evaporation. A QW stack consists of alternating high and low refractive index material layers whose optical thicknesses (refractive index times physical thickness) are tailored to produce a 90 degree phase shift in the light that is transmitted through each layer at a design wavelength. The QW stack is an efficient reflector of light over a wavelength range (stopband) 5 that is centered about the design wavelength, as illustrated in FIG. 1a. The width of the stopband 5 is dependent upon the ratio of the high and low refractive indices of the alternating material layers.

On either side of the stopband 5 are regions of high transmittance 6 with moderate to severe "ripples" in the shape of the transmittance curve. An edge filter is constructed by using either side of the transition between the high reflectance stopband 5 and the high transmission regions 6. A cut-on or long-wavelength pass (LWP) edge filter is constructed by modifying the basic QW design to minimize the ripple on the long wavelength side of the stopband 5, as illustrated in FIG. 1b. Alternatively, a cut-off or short-wavelength pass (SWP) edge filter is constructed by modifying the QW design to minimize the ripple on the short wavelength side of the stopband 5, as illustrated in FIG. 1c. The wavelength at which the edge (or boundary) of either type of filter appears is controlled by controlling the wavelength at which the center of the stopband 5 appears.

An extension of the use of QW stacks is to combine a LWP filter at one design wavelength with a SWP filter at a longer wavelength to produce a bandpass (BP) filter with the transmittance characteristics shown in FIG. 1d. This type of filter transmits light whose wavelength falls between $\lambda_1$ and $\lambda_2$. The edges 8 are defined by the LWP cut-on and SWP cut-off wavelengths. Light with a wavelength that falls outside of the edges 8 is reflected by the QW stack.

A problem associated with optical interference filters is that the peak optical transmittance at the design wavelength decreases as the filter's bandwidth is made narrower. The reduced optical transmittance reduces the signal-to-noise ratio to a level which may be unacceptable.

SUMMARY OF THE INVENTION

In view of the above problem, the present invention provides a differential spectrometry system that can detect very narrow-band spectral features, while providing much higher optical transmittance than prior optical-filter-based spectrometer systems.

This is accomplished by providing a plurality of light detectors that are configured to detect light that falls within respective wide wavebands. The wide wavebands have overlapping and non-overlapping portions, one of which is the desired narrow waveband. The detector outputs are operated upon to produce an output signal which includes substantially only the desired narrow waveband.

In the preferred embodiment, the light detectors are implemented with a pair of optical detectors and respective optical interference filters. The filters have substantially identical cut-off wavelengths ($\lambda_2$) and cut-on wavelengths that are shifted by $\Delta\lambda$ with respect to each other ($\lambda_1$ and ($\lambda_1+\Delta\lambda$), respectively). The filters are positioned so that each detector receives only the light that is transmitted by its respective filter. The detector outputs are differenced with an operational amplifier, so that detector signals resulting from spectral features common to both detectors are canceled. The remaining signal varies according to the amount of light that falls between wavelength boundaries [$\lambda_1$ and ($\lambda_1+\Delta\lambda$)].

A preferred method of fabricating the optical interference filters involves coating two substrates with long wavelength pass (LWP) optical coatings that have a cut-on wavelength of $\lambda_1$, annealing one of the substrates so that the cut-on wavelength of its LWP coating is shifted by $\Delta\lambda$, and coating both substrates with short wavelength pass (SWP) optical coatings that have a cut-off wavelength of $\lambda_2$.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 1a, 1b, 1c and 1d, described above, are graphs illustrating the optical transmittance properties of different types of interference filters.

FIG. 2b is a graph illustrating the optical sensitivity of a first light detector in FIG. 1a.

FIG. 2c is a graph illustrating the optical sensitivity of a second light detector in FIG. 1a.

FIG. 5 is a graph illustrating typical annealing curves for an optical coating that can be used to implement the invention.

DETAILED DESCRIPTION OF THE INVENTION

The basic principle of the invention involves providing a plurality of light detectors that are configured to detect light that falls within respective wide wavebands. The wide wavebands have overlapping and non-overlapping portions, one of which is the desired narrow waveband. The detector outputs are operated upon to produce an output signal which includes substantially only the desired narrow waveband.

Figure 2A:
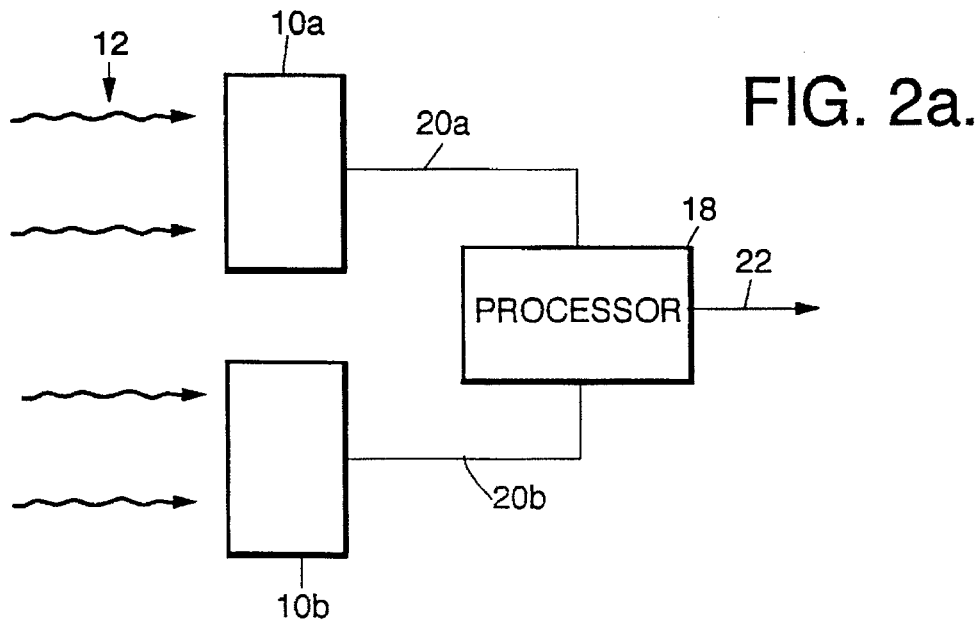
FIG. 2a is a block diagram illustrating the basic principles of the invention.
Figure 2B:
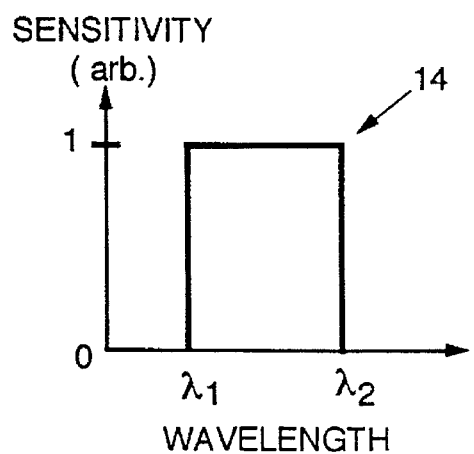
Figure 2C:
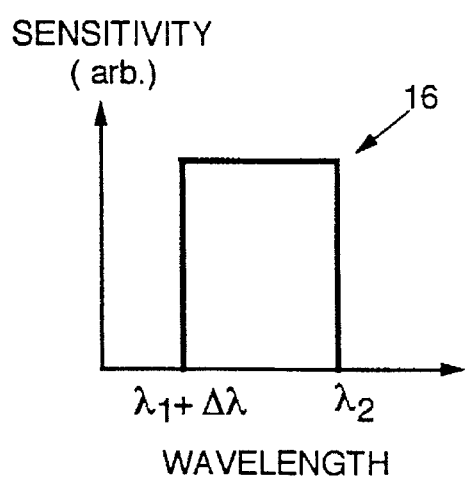

FIGS. 2a–2c illustrate how the invention is implemented with two light detectors. A first light detector 10a is configured so that it is sensitive to portions of incoming light 12 whose wavelengths fall between wavelength boundaries [$\lambda_1$ and $\lambda_2$]. FIG. 2b illustrates this graphically, by showing a plot 14 of sensitivity vs wavelength for detector 10a. A second light detector 10b is configured so that it is sensitive to portions of incoming light 12 whose wavelengths fall between wavelength boundaries [($\lambda_1$+$\Delta\lambda$) and $\lambda_2$], as illustrated in the plot 16 of FIG. 2c.

The outputs of detectors 10a and 10b are sent to a processor 18 along signal lines 20a and 20b. The processor 18 calculates the difference between the two detector outputs, so that detector signals that result from spectral features common to both detectors are canceled. The processor output 22 varies according to the amount of light with wavelengths between boundaries [$\lambda_1$ and ($\lambda_1$+$\Delta\lambda$)]. Although the $\Delta\lambda$ sensitivity difference, as shown in FIGS. 2b and 2c, is implemented at the cut-on wavelength ($\lambda_1$), it could be implemented at the cut-off wavelength ($\lambda_2$) without departing from the scope of the invention.

Figure 3:
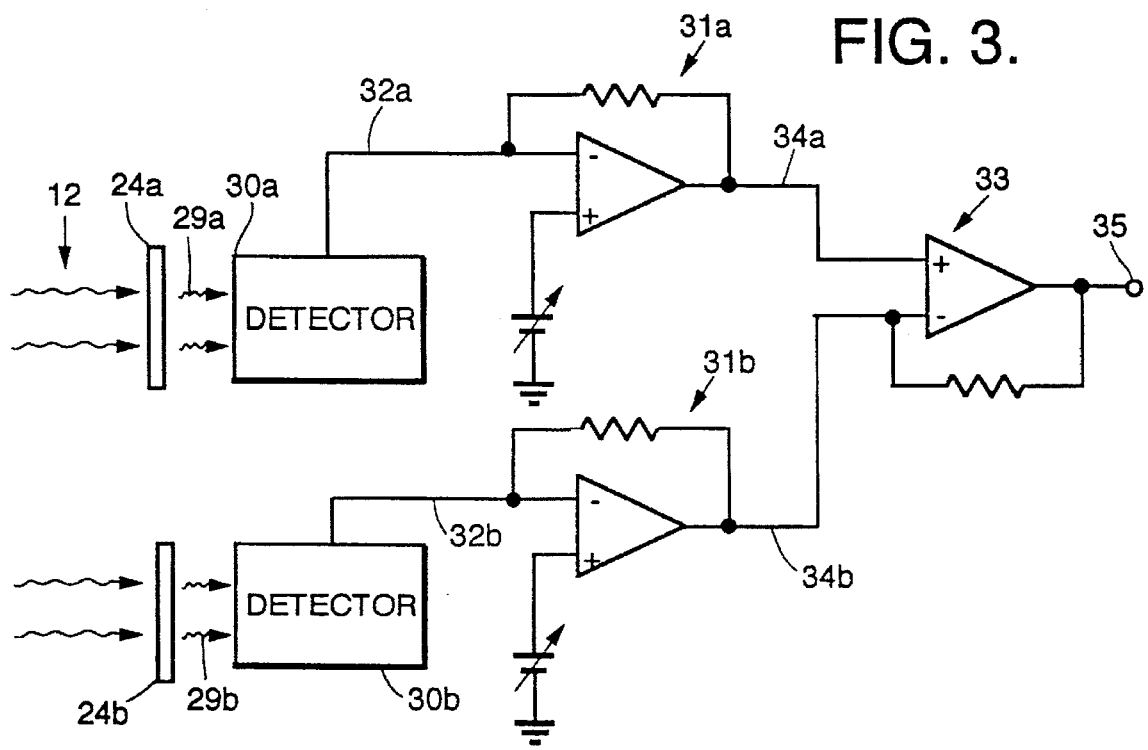
FIG. 3 is a schematic diagram of a preferred embodiment of the invention.

FIG. 3 illustrates a preferred embodiment of the invention. Bandpass (BP) optical filters 24a and 24b transmit light that falls between wavelength boundaries [$\lambda_1$ and $\lambda_2$] and [($\lambda_1$+$\Delta\lambda$) and $\lambda_2$], respectively. Filters 24a and 24b are preferably optical interference filters.

BP filter 24a transmits light 29a that falls within its wavelength boundaries [$\lambda_1$ and $\lambda_2$] to optical detector 30a, while BP filter 24b transmits light 29b that falls within its wavelength boundaries [($\lambda_1$+$\Delta\lambda$) and $\lambda_2$] to optical detector 30b. Detectors 30a and 30b may be of any type that is sensitive over the wavelength range of interest, such as a mercury cadmium telluride or indium antimonide detector if the wavelength range of interest lies between approximately 2.5 to 12 microns.

The electrical outputs of detectors 30a and 30b are transmitted to pre-amplifiers 31a and 31b over signal lines 32a and 32b, respectively, for amplification. The amplified signals are transmitted to a differential amplifier 33, preferably an operational amplifier (op-amp) through signal lines 34a and 34b, respectively. Detector signals that result from spectral features that are common to detectors 30a and 30b are canceled by the differencing operation at the differential amplifier 33. Therefore, the amplifier output 35 varies according to the amount of incident light between wavelength boundaries [$\lambda_1$ and ($\lambda_1$+$\Delta\lambda$)].

The bandwidth of the present spectrometry system is controlled by precisely adjusting the relative cut-on or cut-off wavelength shift $\Delta\lambda$ between the two optical filters 24a and 24b. Because the individual filters have relatively large bandwidths, the optical transmittance of the system is higher than prior systems that utilize a single narrow band optical filter. This results in an improved signal-to-noise ratio.

Figure 4A:
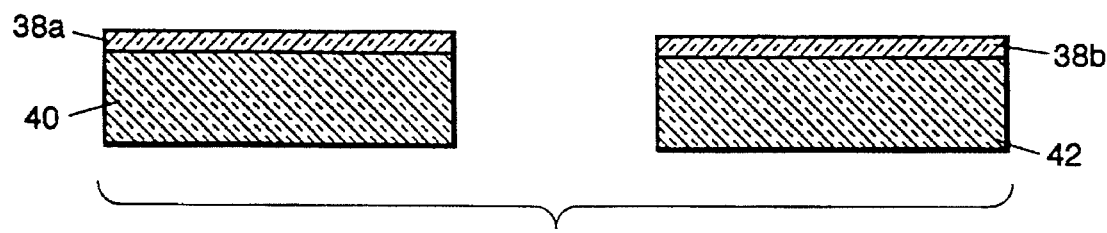
FIGS. 4a and 4b are cross-sectional views illustrating successive steps in a preferred method of fabricating the optical filters of FIG. 3.
Figure 4B:
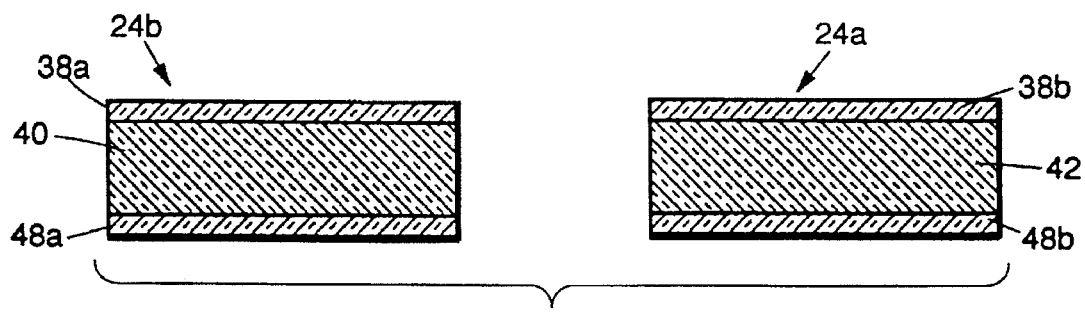

A preferred method of fabricating optical filters with the requisite relative shift in their cut-on or cut-off wavelengths is illustrated in FIGS. 4a and 4b. For illustration, the fabrication of an optical filter set with a relative $\Delta\lambda$ shift in their cut-on wavelengths will be described. However, the present method may also be used to fabricate filters with a relative $\Delta\lambda$ shift in their cut-off wavelengths.

In FIG. 4a, substantially identical LWP coatings 38a and 38b with a cut-on wavelength of $\lambda_1$ are fabricated on substrates 40 and 42. The LWP coatings are preferably QW stacks that are deposited using well known physical vapor deposition techniques. The choice of substrates and QW stack materials will depend upon the particular design wavelength. The substrates 40 and 42 should be optically transparent over the wavelength range of interest. For example, germanium is a preferred substrate material for design wavelengths that fall between approximately 2.5 and 12 microns.

To insure that each LWP coating has a cut-on wavelength of $\lambda_1$, the substrates 40 and 42 are preferably coated together in a common coating run. If desired, one large substrate may be coated and then cut into the two substrates 40 and 42 after the LWP coating has been deposited.

After the LWP coatings are deposited, one of the substrates 40 and its respective LWP coating 38a is annealed in an oven (not shown) to shift the LWP coating's cut-on wavelength by $\Delta\lambda$. At a given temperature, the $\Delta\lambda$ shift in the cut-on wavelength will saturate over time, as illustrated by the family of curves in FIG. 5. FIG. 5 illustrates $\Delta\lambda$ vs time at increasing temperature values $T_1$, $T_2$ and $T_3$. The maximum $\Delta\lambda$ shift 44 that can be achieved depends upon the annealing temperature, the exposure time and the particular material system. It is preferable to operate near the saturation area 46 of the curve so that the $\Delta\lambda$ shift can be precisely controlled by adjusting the annealing temperature. The time required for saturation, and the preferred annealing temperature, will depend on the materials used for the QW stack. As an illustrative example, an annealing temperature of 350 degrees Celsius for two hours will provide a $\Delta\lambda$ shift of approximately 40 nm in an LWP coating made of germanium and zinc sulfide. The annealing temperature and time are dependent on the materials used in the coating and on the coating design. They are generally derived empirically as were the values used in the illustrative example above.

After substrate 40 is annealed, both substrates 40 and 42 are coated with respective SWP coatings 48a and 48b, as illustrated in FIG. 4b. The coatings have a cut-off wavelength of $\lambda_2$, and are preferably QW stacks that are deposited using the same techniques used for the LWP coatings 38a and 38b. To insure that each SWP coating has a cut-off wavelength of $\lambda_2$, the substrates 40 and 42 are preferably coated together in a common coating run. Although the SWP coatings may be deposited on either side of the substrates 40 and 42, they are preferably deposited on the side of the substrate opposite the LWP coatings. The resulting optical filters 24a and 24b have the transmittance properties described above in connection with FIG. 3.

Numerous other variations and alternate embodiments will occur to those skilled in the art without departing from the spirit and scope of the invention. Although a system that uses a pair of detectors and respective optical filters was described as the preferred embodiment, the invention may be practiced with more than two light detectors. With respect to the preferred embodiment described above, the optical filters may be designed so that the relative wavelength shift between them borders the cut-off rather then the cut-on wavelength. In addition, although annealing is described as a preferred method of obtaining the desired cut-on or cut-off wavelength shift, other methods may be used, such as by precisely controlling the thickness of the LWP or SWP QW stack layers during the growth stage. Such variations and alternate embodiments are contemplated, and can be made without departing from the spirit and scope of the appended claims.

We claim:

1. A method for fabricating a set of optical filters for use in a differential spectrometry system, comprising the steps of:

depositing a first bandpass optical coating on a first optically transmissive substrate, said coating passing light that falls between a first set of wavelength boundaries $\lambda_1$ and $\lambda_2$, and depositing a second bandpass optical coating on a second optically transmissive substrate, said coating passing light that falls between a second set of wavelength boundaries $(\lambda_1+\Delta\lambda)$ and $\lambda_2$.

2. The method of claim 1, wherein $\lambda_1<\lambda_2$, and said first and second optical coatings are deposited on said first and second substrates by:

depositing a long wavelength pass (LWP) optical coating with a cut-on wavelength of $\lambda_1$ on said first and second substrates, altering the LWP coating on one of said substrates so that its cut-on wavelength is shifted by $\Delta\lambda$, and depositing a short wavelength pass (SWP) optical coating with a cut-off wavelength of $\lambda_2$ on said first and second substrates.

3. The method of claim 2, wherein said LWP coating on said one substrate is altered by annealing said one substrate until said cut-on wavelength is shifted by $\Delta\lambda$.

4. The method of claim 1, wherein said LWP coating is deposited on a single substrate, and said single substrate is subsequently divided into said first and second substrates.

5. The method of claim 1, wherein $\lambda_1>\lambda_2$, and said first and second optical coatings are deposited on said first and second substrates by:

depositing a short wavelength pass (SWP) optical coating with a cut-off wavelength of $\lambda_1$ on said first and second substrates, altering the SWP coating on one of said substrates so that its cut-off wavelength is shifted by $\Delta\lambda$, and depositing a long wavelength pass (LWP) optical coating with a cut-on wavelength of $\lambda_2$ on said first and second substrates.

6. The method of claim 5, wherein said SWP coating on said one substrate is altered by annealing said one substrate until said cut-off wavelength is shifted by $\Delta\lambda$.

7. The method of claim 5, wherein said SWP coating is deposited on a single substrate, and said single substrate is subsequently divided into said first and second substrates.

* * * * *